United States Patent
Kuo et al.

(10) Patent No.: US 11,130,709 B2
(45) Date of Patent: Sep. 28, 2021

(54) POLYALKOXYLATED POLYAMINE OXIDE DEFOAMING COMPOSITIONS

(71) Applicant: W. R. Grace & Co.-Conn., Cambridge, MA (US)

(72) Inventors: Lawrence L. Kuo, Acton, MA (US); Ying Chen, Arlington, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 389 days.

(21) Appl. No.: 14/716,139

(22) Filed: May 19, 2015

(65) Prior Publication Data

US 2016/0340248 A1 Nov. 24, 2016

(51) Int. Cl.
| | |
|---|---|
| C04B 24/12 | (2006.01) |
| C04B 24/28 | (2006.01) |
| C09D 179/02 | (2006.01) |
| C08G 73/02 | (2006.01) |
| C04B 28/02 | (2006.01) |
| C04B 40/00 | (2006.01) |
| C04B 103/50 | (2006.01) |
| C04B 111/00 | (2006.01) |

(52) U.S. Cl.
CPC .......... *C04B 24/121* (2013.01); *C04B 24/28* (2013.01); *C04B 28/02* (2013.01); *C04B 40/0039* (2013.01); *C08G 73/024* (2013.01); *C09D 179/02* (2013.01); *C04B 2103/50* (2013.01); *C04B 2111/00482* (2013.01)

(58) Field of Classification Search
CPC ..... C04B 28/02; C04B 22/068; C04B 24/121; C04B 24/122; C04B 24/18; C04B 24/223; C04B 24/226; C04B 24/2647; C04B 2103/50; C04B 40/0039; C04B 2103/0095; C04B 2103/12; C04B 2103/22; C04B 2103/304; C04B 24/32; C04B 2111/00482; C04B 24/28; C04B 24/283; C08G 73/024; C09D 179/02
See application file for complete search history.

(56) References Cited

U.S. PATENT DOCUMENTS

| | | |
|---|---|---|
| 4,224,076 A | 9/1980 | Moitra et al. |
| 4,548,744 A | 10/1985 | Connor |
| 5,746,822 A | 5/1998 | Espinoza et al. |
| 5,866,718 A | 2/1999 | Prabhu |
| 5,955,633 A | 9/1999 | Prabhu |
| 6,103,678 A | 8/2000 | Masschelein et al. |
| 6,172,147 B1 | 1/2001 | Abelleira et al. |
| 6,277,181 B1 | 8/2001 | Condra et al. |
| 6,451,880 B1 | 9/2002 | Jardine |
| 6,545,067 B1 | 4/2003 | Buchner et al. |
| 6,670,415 B2 | 12/2003 | Jardine et al. |
| 7,261,772 B1 | 8/2007 | Schwartz et al. |
| 7,393,424 B2 | 7/2008 | Schwartz et al. |
| 8,187,376 B2 | 5/2012 | Kuo |
| 8,317,918 B1 | 11/2012 | Kuo |
| 2003/0173302 A1 | 9/2003 | Xiong et al. |
| 2005/0113541 A1 | 5/2005 | Tsumori et al. |

FOREIGN PATENT DOCUMENTS

| | | |
|---|---|---|
| EP | 0092862 | 3/1986 |
| EP | 0042188 | 2/1990 |
| EP | 0841391 | 5/1998 |
| EP | 0713521 | 7/1998 |
| EP | 1375455 | 1/2004 |
| WO | 9742285 | 11/1997 |

OTHER PUBLICATIONS

Thomas, Form PCT/ISA/210, International Search Report for International Application PCT/US2016/032620, dated Aug. 19, 2016, 2 pages.
Thomas, Form PCT/ISA/237, Written Opinion of the International Searching Authority for International Application PCT/US2016/032620, dated Aug. 19, 2016, 8 pages.
Ouattara, "Influence of Water on the Anodic Oxidation Mechanism of Diethylenetriamine (DETA) on Platinum Electrode", Bull. Chem. Soc. Ethiop. 2006, 20(2), 269-277.
Murahashi, "Ruthenium-Catalyzed Oxidative Cyanation of Tertiary Amines with Molecular Oxygen or Hydrogen Peroxide and Sodium Cyanide: sp3 C—H Bond Activation and Carbon-Carbon Bond Formation", J. Am. Chem. Soc. vol. 130, No. 33, 2008, 11005-11012.

*Primary Examiner* — Shuangyi Abu Ali

(74) *Attorney, Agent, or Firm* — Craig K. Leon

(57) ABSTRACT

The present invention provides a composition and method for controlling air voids in aqueous systems such as paints, coatings, sealants, adhesives, mastics, cements, mortar, masonry, or concrete, which comprises the reaction product of an oxidizing agent and a compound comprising at least one polyalkoxylated polyalkylene polyamine, at least one polyalkyoxylated polyethyleneimine, or a mixture thereof.

19 Claims, No Drawings

POLYALKOXYLATED POLYAMINE OXIDE DEFOAMING COMPOSITIONS

FIELD OF THE INVENTION

This invention relates to agents for modifying air in an aqueous composition, and more particularly to a novel class of air management compositions based on polyalkoxylated polyamine oxides for controlling air content and quality, over a relatively wide pH range, within aqueous systems, such as paints, sealants, coatings, concrete, mortar, masonry, or other aqueous compositions.

BACKGROUND OF THE INVENTION

It is known to employ amine defoamers for modifying air content and quality within aqueous environments such as hydratable cement and concrete.

In U.S. Pat. No. 8,187,376, owned by the common assignee hereof, Kuo taught additive compositions for controlling air in cementitious compositions wherein a polyalkoxylated polyalkylene polyamine defoamer is used in combination with certain air-entraining agents, such as alkanolamine compounds, oxyalkylene-containing water reducing or plasticizing agents, and other agents. In the '376 patent, Kuo explained that these compounds improve the stability of air-entraining additives used in cement and concrete mixes, but without curtailing the effectiveness of defoaming additives.

The present invention reflects the continued pursuit of the challenge to discover a novel and unexpected defoaming agent which is highly stable and effective in aqueous systems such as cement, mortar, masonry, and concrete, due to applicability over wide pH ranges, as well as in aqueous compositions such as paints, latexes and emulsions (e.g., polymer latexes or emulsions), primers, sealants, adhesives, mastics, and others.

SUMMARY OF THE INVENTION

The present invention provides novel composition and method for modifying the content and quality of air in aqueous compositions, such as paints, primers, sealants, adhesive, mastic, and other aqueous compositions, and also including hydratable cementitious compositions such as cement, concrete, mortar, and masonry compositions.

The present inventors have surprisingly discovered that the use of an oxidized polyalkoxylated polyamine provides beneficial air detraining characteristics in aqueous environments such cement or concrete compositions. This behavior is unexpected because alkylamine oxide surfactants otherwise typically entrain air rather than detrain it. The polyalkoxylated polyamine oxides provide exceptional stability and solubility in aqueous systems, and demonstrate excellent compatability when used with conventional concrete admixtures over an extended pH range, including neutral and high pH (>7) environments.

An exemplary composition of the invention comprises the reaction product of at least one oxidizing agent and a compound comprising at least one polyalkoxylated polyalkylene polyamine, at least one polyalkyoxylated polyethyleneimine, or mixture thereof; the at least one polyalkoxylated polyalkylene polyamine being represented by structural formula A

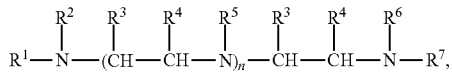

[Formula A]

and the at least one polyalkoxylated polyethyleneimine being represented by structural formula B, -(AO)$_x$-(EI)$_y$-      [Formula B], wherein $R^1$, $R^2$, $R^3$, $R^4$, $R^5$, $R^6$, and $R^7$ each individually represents a hydrogen, $C_1$-$C_6$ alkyl group, —$CH_2$—OH group, or -(AO)$_x$-$R^8$ group; AO represents an alkylene oxide group selected from ethylene oxide ("EO"), propylene oxide ("PO"), butylene oxide ("BO"), or a mixture thereof, wherein the relative molar amount of EO compared to other alkylene oxides within AO is zero percent to less than fifty percent of the total, and wherein the total sum of the number of EO and PO groups exceeds 25; n represents an integer of 0 to 20; x represents an integer of 1 to 100; $R^8$ represents hydrogen or a $C_1$-$C_6$ alkyl group; -(EI)$_y$- represents repeating ethyleneimine units in a linear or branched structure; y represents an integer of 5 to 100; and the relative number of -(AO)$_x$- chains per repeating ethyleneimine unit is 0.1 to 1.0.

In exemplary embodiments of the invention, the reaction product is an oxide derived from ethylene diamine, diethylene triamine, triethylene tetramine, tetraethylene pentamine, pentaethylene hexamine, propylene diamine, dipropylene triamine, tripropylene tetramine, tetrapropylene pentamine, pentapropylene hexamine, N,N-dimethylethylene diamine, N,N'-dimethylethylene diamine, N,N-dimethylpropylene diamine, N,N'-dimethylpropylene diamine, N,N-diethylethylene diamine, N,N'-diethylethylene diamine, N,N-diethylpropylene diamine, N,N'-diethylpropylene diamine, or a mixture thereof. Most preferred are the oxides derived from ethylene diamine, diethylene triamine, triethylene tetramine, or mixture thereof.

Another exemplary composition of the invention comprises the above-described oxidized polyalkoxylated polyamine and one or more air entraining agents which entrain air in an aqueous environment. For aqueous cementitious environments such as mortar and concrete slurries or pastes, the air entraining agent may comprise a higher trialkanolamine, a lignosulfonate, a sulfonated naphthalene formaldehyde condensate, a sulfonated melamine formaldehyde condensate, an oxyalkylene-containing superplasticizer, an oxyalkylene-containing shrinkage reducing agent, or a mixture thereof.

While the oxidized polyalkoxylated polyamine may be introduced into the aqueous environment separately, it is more preferably introduced into the aqueous environment of the mortar or concrete along with the at least one air entraining agent, as a formulated admixture product having, as previously mentioned, a beneficial compatibility its components, thereby conferring advantageous stability for purposes of transportation, storage, or dispensing of the formulated product across a relatively wide pH range.

The present invention is further directed to aqueous compositions which contain the aforementioned oxidized polyalkoxylated polyamine, with or without air entraining agents, as well as to methods for modifying aqueous environments, such as aqueous coatings, paints, adhesives, cements, concretes, and the like, using the aforesaid oxidized polyalkoxylated polyamine with or without air entraining agents.

Further features and benefits of the present invention are set forth in detail hereinafter.

DETAILED DESCRIPTION OF EXEMPLARY EMBODIMENTS

As summarized above, oxidized polyalkoxylated polyamine compositions of the present invention are useful for detraining air in aqueous compositions such as water-based paints (e.g., polymer paints), primers, mastics, sealants, adhesives, and other aqueous compositions. Reduced air voids can lead to reduced pin-hole effects, and hence higher barrier properties, such as when the coating composition hardens or cures into a protective coating layer on a building or construction surface.

Exemplary aqueous compositions of the present invention include water-based paints, such as acrylic paints (or paints which employ other polymers or resins). Given their relatively wide pH application range, the polyalkoxylated polyamine oxide compounds of the present invention can be used in coating compositions for building or construction surfaces which require alkali resistance, such as cement and concrete, fresh masonry, stucco, and plaster, as well as onto brick, stone, and masonry blocks (which may comprise or contact cement or mortar).

An exemplary coating composition of the invention comprises (i) a binder material (such as a polymer or resin) operative to form a coating upon a surface when applied thereto as a liquid aqueous coating composition and allowed to dry, and (ii) the oxidized polyalkoxylated polyamine composition as summarized previously in the Summary of the Invention, optionally with one or more air entraining additives. Exemplary polymers or resins can include an acrylic, polyurethane, rubber (e.g., styrene butyl rubber), or other water-dispersible material which agglomerates, cross-links, bonds together, and/or otherwise forms a monolithic coating layer upon a surface when applied as a liquid aqueous coating composition and allowed to dry and/or harden. The coating composition may be a solution, latex or emulsion, or other flowable or liquid-applied form which may be brushed, troweled, sprayed, rolled, or otherwise applied.

The polyalkoxylated polyamine oxides of the present invention are particularly beneficial when used in the form of additive (admixture) compositions for detraining air within hydratable cementitious compositions such as cement, mortar, masonry, and concrete compositions.

The term "cement" as used herein includes hydratable cement which is produced by pulverizing clinker consisting of hydraulic calcium silicates and one or more forms of calcium sulfate (e.g., gypsum) as an interground additive. "Mortars" are cement pastes formed with water and additionally including fine aggregate (e.g., sand). "Concretes" are mortars which additionally include coarse aggregate (e.g., crushed stones or gravel).

The term "cementitious" as used herein refers to materials that include or comprise cement (e.g., Portland cement) or which otherwise function as a binder to hold together fine aggregates (e.g., sand), coarse aggregates (e.g., crushed gravel), or mixtures thereof. Typically, Portland cement is combined with one or more other supplementary cementitious materials ("SCMs") and provided as a blend. SCMs may include limestone, hydrated lime, fly ash, granulated blast furnace slag, and silica fume, or other materials commonly included in such cements. Cementitious materials may therefore include one or more SCMs preferably in an amount of 0%-100%, more preferably 10%-60%, based on total dry weight of cementitious material.

The term "hydratable" as used herein is intended to refer to cement or cementitious materials that are hardened by chemical interaction with water. Portland cement clinker is a partially fused mass primarily composed of hydratable calcium silicates. The calcium silicates are essentially a mixture of tricalcium silicate (3CaO.SiO2 "C3S" in cement chemists notation) and dicalcium silicate (2CaO.SiO2, "C2S") in which the former is the dominant form, with lesser amounts of tricalcium aluminate (3CaO.Al2O3, "C3A") and tetracalcium aluminoferrite (4CaO.Al2O3-Fe2O3, "C4AF"). See e.g., Dodson, Vance H., Concrete Admixtures (Van Nostrand Reinhold, New York N.Y. 1990), page 1.

In various embodiments of the invention, the polyalkoxylated polyamine oxides can be used as a defoaming agent within an aqueous composition.

An exemplary embodiment relates to an additive or admixture for modifying a hydratable cementitious composition, wherein the additive comprises at least one air entraining agent and the polyalkoxylated polyamine oxide. Examples of air entraining agents include a higher trialkanolamine, a lignosulfonate, a naphthalene sulfonate, a melamine sulfonate, an oxyalkylene-containing superplasticizer, an oxyalkylene-containing shrinkage reducing agent, or a mixture thereof. The term "additive" shall be used herein to describe additives added at the cement manufacturing plant and also to describe "admixtures" which are added to cement, water, and optional aggregates used for making cement mortars, concretes, and other cementitious materials. Preferably, the additive compositions are aqueous liquids that may be dispensed (e.g., pump-metered) in liquid form.

The term "higher trialkanolamine" as used herein shall refer to tertiary amine compounds which are tri(hydroxyalkyl) amines having at least one C3-C5 hydroxyalkyl, and, more preferably, at least one C3-C4 hydroxyalkyl, group therein. The remaining (if any) hydroxyalkyl groups of the tertiary amine can be selected from C1-C2 hydroxyalkyl groups (preferably C2 hydroxyalkyl). Examples of such compounds include hydroxyethyl di(hydroxypropyl)amine, hydroxypropyl di(hydroxyethyl)amine, tri(hydroxypropyl) amine, hydroxyethyl di(hydroxy-n-butyl)amine, tri(2-hydroxybutyl)amine, hydroxybutyl di(hydroxypropyl)amine, and the like. The preferred higher trialkanolamines are triisopropanolamine ("TIPA"), N,N-bis(2-hydroxyethyl)-N-(2-hydroxypropyl)amine ("DEIPA"), N,N-bis(2-hydroxypropyl)-N-(hydroxyethyl)amine ("EDIPA"), and tri(2-hydroxybutyl) amine. Mixtures of such higher trialkanolamines can be used, and any of these or a combination of these can be used with one or more of triethanolamine (TEA), diethanolamine (DEA), monoethanolamine, or mixtures thereof. When used as a grinding additive for Portland cement or blended cement, the higher trialkanolamines can be added in an amount up to 2%, preferably up to 0.1%, and most preferably between 0.005%-0.03% based on weight of the cement. In particular, TIPA is known for use as a late strength enhancer.

The terms "lignosulfonate," "naphthalene sulfonate," "melamine sulfonate," and "oxyalkylene-containing superplasticizer" are used herein to refer to water-reducing agents ("WRA") known to entrain air. A "lignosulfonate" WRA includes alkali metal or alkaline earth salts of lignosulfonic acid, such as calcium lignosulfonate, which is a commonly-used WRA. A "naphthalene sulfonate" WRA includes an alkali metal salt of a sulfonated naphthalene-formaldehyde condensate; while a "melamine sulfonate" WRA includes an alkali metal salt of a sulfonated melamine-formaldehyde condensate.

References to compounds in their salt form may be understood to include reference to their acid form, and vice-versa, because it may be the case that both acid and salt forms can co-exist within the aqueous environment. Similarly, it may also be understood that reference to compounds in their amine form may be understood to include reference to their ammonium form, and vice-versa.

The term "oxyalkylene-containing superplasticizer" will refer to water-reducing agents, typically comb polymers comprised of polycarboxylic acid or partial esters to which are attached pendant polyoxyalkylene groups. Such oxyalkylene groups include ethylene oxide (EO), propylene oxide (PO), and butylene oxide (BO). Such oxyalkylene-containing superplasticizer will be any of those customarily used in the cement and concrete industries. For example, polymeric superplasticizers which are comb polymers having a carbon-containing backbone to which are attached polyoxyalkylene groups through amide, imide, ester, and/or ether linkages are contemplated for use in the present invention. Other examples of oxyalkylene-containing superplasticizers include copolymers of acrylic or methacrylic acid with the reaction product of acrylic acid or methacrylic acid with polyalkyleneglycol monomethyl ether. A further example of oxyalkylene-containing superplasticizers includes copolymers of acrylic acid or methacrylic acid with polyalkoxylated alcohols with typical alcohol chain lengths of C3 to C20.

Generally, the amount of air-entraining water reducing agent (WRA) used in the invention which is to be added to cement compositions will be in amounts of at least about 0.005 weight percent, and usually in the range of 0.005 to about 5 weight percent, and preferably 0.03 weight percent to about 1 weight percent based on the total weight of the cement or cementitious composition.

Exemplary compositions of the present invention, as previously summarized, comprise the reaction product of at least one oxidizing agent and a compound comprising at least one polyalkoxylated polyalkylene polyamine, at least one polyalkyoxylated polyethyleneimine, or mixture thereof; the at least one polyalkoxylated polyalkylene polyamine being represented by structural formula A

[Formula A]

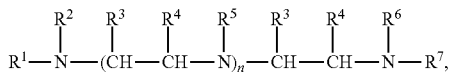

and the at least one polyalkoxylated polyethyleneimine being represented by structural formula B,

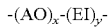 [Formula B], wherein $R^1$, $R^2$, $R^3$, $R^4$, $R^5$, $R^6$, and $R^7$ each individually represents a hydrogen, $C_1$-$C_6$ alkyl group, —$CH_2$—OH group, or -$(AO)_x$-$R^8$ group; AO represents an alkylene oxide group selected from ethylene oxide ("EO"), propylene oxide ("PO"), butylene oxide ("BO"), or a mixture thereof, wherein the relative molar amount of EO compared to other alkylene oxides within AO is zero percent to less than fifty percent of the total; n represents an integer of 0 to 20; x represents an integer of 1 to 100; the sum total of the number of EO and PO groups exceeding 25; $R^8$ represents hydrogen or a $C_1$-$C_6$ alkyl group; -$(EI)_y$- represents repeating ethyleneimine units in a linear or branched structure; y represents an integer of 5 to 100; and the relative number of -$(AO)_x$- chains per repeating ethyleneimine unit is 0.1 to 1.0.

It is preferred that exemplary reaction products of the present invention, as formed from oxidation of the polyalkoxylated polyamine as described above, do not contain linear or branched alkyl groups exceeding six carbons in length, as higher alkyl groups will tend to form a hydrophobic fatty group that tends to entrap air bubbles in the manner of a detergent within the aqueous environment into which the reaction product compound is introduced. Thus, the reaction product of the at least one oxidizing agent and compound comprising at least one polyalkoxylated polyalkylene polyamine, at least one polyalkyoxylated polyethyleneimine, or mixture thereof, is preferably devoid of a linear or branched alkyl group having greater than six (6) carbon atoms, and, more preferably, devoid of a linear or branched alkyl group having greater than four (4) carbon atoms.

Exemplary oxidizing agents suitable for use in the present invention include, but are not limited to, hydrogen peroxide, peroxyacids such as performic acid, peracetic acid, perbenzoic acid, chloroperoxybenzoic acid, monoperphthalic acid, perfsulfuric acid, molecular oxygen, and ozone.

Although the optimum degree of oxidation of the tertiary amine defoamer will vary depending on the specific application and depending on the molecular weight and chemical structure of the starting polyalkoxylated polyamine material, 10 molar percent to 100 molar percent of the tertiary amine groups should preferably be oxidized into amine oxide groups, and, more preferably, 20 molar percent to 100 molar percent of the tertiary amine groups should be oxidized into amine oxide groups.

In preferred exemplary embodiments, the defoamer is made by oxidation of a polyalkoxylated polyalkylene polyamine. Exemplary polyalkylene polyamines suitable for use in the present invention include, but are not limited to, ethylene diamine, diethylene triamine, triethylene tetramine, tetraethylene pentamine, pentaethylene hexamine, propylene diamine, dipropylene triamine, tripropylene tetramine, tetrapropylene pentamine, pentapropylene hexamine, N,N-dimethylethylene diamine, N,N'-dimethylethylene diamine, N,N-dimethylpropylene diamine, N,N'-dimethylpropylene diamine, N,N-diethylethylene diamine, N,N'-diethylethylene diamine, N,N-diethylpropylene diamine, N,N'-diethylpropylene diamine. More preferred of these polyalkylene polyamines are ethylene diamine, diethylene triamine, triethylene tetramine, or mixtures thereof, with the most preferred being diethylene triamine.

In other exemplary embodiments, the polyalkoxylation is carried out by reacting the polyalkylene polyamine with ethylene oxide, propylene oxide, or a higher alkylene oxide. In still further exemplary embodiments, the polyalkylene polyamine may be alkoxylated by reacting it with ethylene oxide and propylene oxide and/or butylene oxide, wherein the molar ratio of propylene oxide group(s) and/or butylene oxide group(s) to ethylene oxide group(s) is greater than 1; and wherein the sum total of the number of EO and PO groups exceeds 25. In another preferred embodiment, the amount of ethylene oxide groups is in the range of 0%-40% based on total weight of the polyethers, whereas the amount of propylene oxide groups and/or butylene oxide groups is in the range of 60%-100% based on total weight of the polyethers.

In further exemplary embodiments, the oxidized polyalkoxylated polyalkylene polyamine defoamer of component A has a number-average molecular weight of 500-7,000. More preferably, the number-average molecular weight is 1,000-6,000; and most preferably the number-average molecular weight is 2,000-4,000.

In further exemplary embodiments, the defoamer is made by oxidation of polyalkoxylated polyethyleneimine. The polyethyleneimine or polyaziridine can have linear and/or branched chemical structure and has a number-average molecular weight in the range of 400 to 5,000.

In further exemplary embodiments, the oxidized polyalkoxylated polyethyleneimine defoamer of component B has a number-average molecular weight of 1,000-15,000. More preferably, the number-average molecular weight is 2,000-10,000; and most preferably the number-average molecular weight is 3,000-7,000.

In exemplary embodiments of the present invention, the polyalkoxylated polyamine oxide defoaming agent, obtained as the reaction product as described above, may be incorporated separately into an aqueous environment, such as a paint, coating composition, or hydratable cementitious composition, such as mortar or concrete, separately or in combination with air entraining materials.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples.

Example 1

Synthesis of Amine Oxide

Polypropoxylated diethylene triamine with a number-average molecular weight ($M_n$) of 2,550 (100 g, 0.039 mol), n-propanol (50 ml) and acetic acid (0.2 g) were added into a reaction vessel. The mixture was heated with stirring to 50° C., and then 30 wt % aqueous hydrogen peroxide solution (4.54 g, 0.04 mol) was dropped into the mixture over a period of 40 min at 50-55° C. After hydrogen peroxide addition, the mixture was kept at 60-65° C. with stirring for 18 hours. The resulting amine oxide product (sample AO1) was collected by removing n-propanol solvent using a rotary evaporator.

Amine oxide sample AO2 and AO3 were synthesized in a similar fashion with increased amounts of hydrogen peroxide (Table 1).

TABLE 1

(Synthesized Amine Oxides)

| Amine oxide product | Starting tertiary amine (g) | 30 wt % aqueous hydrogen peroxide (g) |
|---|---|---|
| Sample AO1 | Polypropoxylated diethylene triamine ($M_n$ 2,550), 100 | 4.54 |
| Sample AO2 | Polypropoxylated diethylene triamine ($M_n$ 2,550), 100 | 9.08 |
| Sample AO3 | Polypropoxylated diethylene triamine ($M_n$ 2,550), 100 | 13.6 |

Example 2

Formulation Stability

In this example, the stability of different defoamer additive in a low pH admixture containing polycarboxylate ether dispersant was evaluated. The admixtures containing defoamers were prepared according to the recipe in Table 2. Water (32.9 g), Sample AO1 (0.40 g) and 60% aqueous polycarboxylate dispersant solution (66.7 g) were added into a beaker under stirring, then the mixture was stirred until it became homogeneous. The pH of this mixture was adjusted to 3.5-4.0 with acetic acid. The mixture was kept in 50 ml cylinders both in 25° C. and 50° C. ovens while its stability was monitored visually for 30 days or until phase separation occurs.

TABLE 2

(Admixture Stability Test)

| Entry | Polycarboxylate ether dispersant solution (g) | Additive (g) | | pH | Stability (day)[a] | |
|---|---|---|---|---|---|---|
| | | | | | 25° C. | 50° C. |
| 1 | 66.7 | Polypropoxylated diethylene triamine ($M_n$ 2,550) | 0.4 | 3.7 | 30 | 30 |
| 2 | 66.7 | Sample AO1 | 0.4 | 3.7 | 30 | 30 |
| 3 | 66.7 | Sample AO2 | 0.4 | 3.7 | 30 | 30 |
| 4 | 66.7 | Sample AO3 | 0.4 | 3.7 | 30 | 30 |

[a]Stability is represented by the time before phase separation is observed within a maximum of 30 days.

From Table 2, it is evident that the amine oxide defoamer additives AO1, AO2 and AO3 are equally stable in admixtures with their starting amine material under acidic condition.

Example 3

Formulation Stability

In this example, the stability of different defoamer additive was evaluated in a neutral pH admixture containing polycarboxylate ether dispersant. The admixtures containing defoamers were prepared according to the recipe in Table 3. Water (19.6 g), Sample AO1 (0.40 g) and 50% aqueous polycarboxylate ether dispersant solution (80 g) were added into a beaker under stirring, then the mixture was stirred until it became homogeneous. The resultant mixture has a pH value between 6.25 and 7.0. The admixture was kept in 50 ml cylinders in 25° C. and 50° C. ovens, and their stability was monitored visually over 30 days or until phase separation occurs.

TABLE 3

(Admixture Stability Test)

| Entry | Polycarboxylate ether dispersant solution (g) | Additives (g) | | pH | Stability (day)[a] | |
|---|---|---|---|---|---|---|
| | | | | | 25° C. | 50° C. |
| 5 | 80 | Polypropoxylated diethylene triamine ($M_n$ 2,550) | 0.4 | 6.7 | <1 | <1 |
| 6 | 80 | Sample AO1 | 0.4 | 6.6 | 2 | <1 |
| 7 | 80 | Sample AO2 | 0.4 | 6.6 | 18 | 5 |
| 8 | 80 | Sample AO3 | 0.4 | 6.7 | 21 | 10 |

[a]Stability is represented by time elapsed before phase separation is observed within a maximum of 30 days.

As evidenced in Table 3, the amine oxide defoamer additives are more stable in admixtures compared to their starting amine material under neural pH condition.

Example 4

Formulation Stability

In this example, the stability of different defoamer additive was evaluated in a high pH admixture containing polycarboxylate ether dispersant and set accelerants. The admixtures were prepared according to the recipe in Table 4. Water (76.1 g), 60% aqueous polycarboxylate ether dispersant solution (13.3 g), and sodium hydroxide (0.4 g) were added into a beaker under stirring. After fully mixing, the resultant mixture has a pH above 8. Then calcium nitrite (5.6 g, 32% solution), sodium thiocyanate (4.0 g, 50% solution) and Sample AO1 (0.2 g) were added into the admixture and stirred until it became homogeneous. The pH of the final admixture solution was adjusted with sodium hydroxide to 8.5-9.5. The admixture was kept in 50 ml cylinders in 25° C. and 50° C. ovens, and their stability was monitored visually over 30 days or until phase separation occurs.

TABLE 4

(Admixture Stability Test[a])

| Entry | Polycarboxylate ether dispersant solution (g) | Additives (g) | | pH | Stability (day)[b] | |
|---|---|---|---|---|---|---|
| | | | | | 25° C. | 50° C. |
| 9 | 13.3 | Polypropoxylated diethylene triamine ($M_n$ 2,550) | 0.2 | 9.0 | <1 | <1 |
| 10 | 13.3 | Sample AO1 | 0.2 | 9.1 | 30 | 9 |
| 11 | 13.3 | Sample AO2 | 0.2 | 9.1 | 30 | 10 |
| 12 | 13.3 | Sample AO3 | 0.2 | 9.0 | 30 | 5 |

[a]All admixture contain sodium hydroxide (0.4 g), 36 wt % calcium nitrite solution (5.6 g) and 50 wt % sodium thiocyanate solution (4.0 g).
[b]Stability is represented by the time elapsed before phase separation is observed within a maximum of 30 days.

The results in Table 4 clearly indicate that the admixtures containing the amine oxide defoamer additives of the present invention are much more stable in than the admixture containing the starting amine defoamer under alkaline condition.

Example 5

Mortar Air Testing

In this example, the defoaming efficacy of different amine oxide was evaluated in standard mortar test for workability and air content, and the mortar air content was measured in accordance with ASTM C185-02 standard. The composition of mortar was as following: cement (540 g), sand (1400 g), polycarboxylate dispersant (0.9 g, 60 wt %), defoamer additive (0.011 g), and water (225 g).

TABLE 5

(ASTM C185 Mortar Air Test[a])

| Entry | Additives (g) | | Workability (mm) | Air (%) |
|---|---|---|---|---|
| 13 | none | 0 | 273 | 10.2 |
| 14 | Polypropoxylated diethylene triamine ($M_n$ 2,550) | 0.011 | 255 | 3.1 |
| 15 | Sample AO1 | 0.011 | 253 | 2.7 |
| 16 | Sample AO2 | 0.011 | 252 | 2.7 |
| 17 | Sample AO3 | 0.011 | 246 | 3.0 |

TABLE 5-continued (ASTM C185 Mortar Air Test[a])

| Entry | Additives (g) | | Workability (mm) | Air (%) |
|---|---|---|---|---|
| 18 | Comparative Additive: Dimethyl tetradecylamine oxide | 0.011 | 253 | 18.6 |

By comparing entries 15, 16 and 17 to entry 13 in Table 5, it was clear that the claimed amine oxide defoamers, Samples AO1~AO3 were effective in reducing air content in mortar. On the contrary, dimethyl tetradecylamine oxide, in entry 18 of Table 5, did not have defoaming abilities; it increased mortar air content.

Example 6

Concrete Air Testing

In this example, the defoaming efficacy of different amine oxide was evaluated in concrete against the polypropoxylated diethylene triamine starting material. Concrete mixes were carried out according to the following composition: ordinary Portland cement, 11.7 kg; water, 4.48 kg; coarse aggregate, 29.1 kg; fine aggregate, 25.1 kg; polycarboxylate ether dispersant (60 wt % solution), 17 g; commercial air-entraining agent DARAVAIR®1000, 1.2 g; and amine oxide additive or amine additive as listed. Air content was measured in accordance with ASTM C231-97. The results were summarized in Table 6.

TABLE 6

Concrete test

| Entry | Additive | (g) | Air (%) |
|---|---|---|---|
| 19 | none | 0 | 8.5 |
| 20 | Polypropoxylated diethylene triamine ($M_n$ 2,550) | 0.3 | 3.4 |
| 21 | Sample AO1 | 0.3 | 3.8 |
| 22 | Sample AO2 | 0.3 | 4.2 |

The data in Table 6 clearly indicate that the amine oxide of the invention (entries 21 and 22) are effective defoamers in reducing air content in concrete (compared to entry 19).

The foregoing example and embodiments were present for illustrative purposes only and not intended to limit the scope of the invention.

It is claimed:

1. A composition for modifying air in a cementitious composition, comprising:
   the reaction product of at least one oxidizing agent and a compound comprising at least one polyalkoxylated polyalkylene polyamine represented by structural formula A

[Formula A]

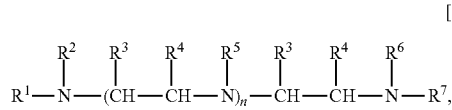

wherein
n represents an integer of 0 to 4;
$R^1$, $R^2$, $R^3$, $R^4$, $R^5$, $R^6$, and $R^7$ each individually represents a hydrogen, $C_1$-$C_6$ alkyl group, —$CH_2$—OH group, or -(AO)$_x$-R$^8$ group, and wherein at least two of the -R$^1$, R$^2$, R$^3$, R$^4$, R$^5$, R$^6$, and R$^7$ represent an -(AO)$_x$-R$^8$ group, provided that when n=0 then at least two of R$^1$, R$^2$, R$^3$, R$^4$, R$^6$, and R$^7$ represent -(AO)$_x$- R$^8$;

wherein AO represents an alkylene oxide group chosen from ethylene oxide, propylene oxide butylene oxide, or a mixture thereof;

wherein the relative molar amount of ethylene oxide compared to other alkylene oxide groups within AO is zero percent to less than fifty percent of the total;

wherein the total sum of the number of ethylene oxide and propylene oxide groups exceeds 25;

wherein x represents an integer of 26 to 100;

wherein R$^8$ represents hydrogen or a C$_1$-C$_6$ alkyl group; and wherein the reaction product of the at least one oxidizing agent and the compound comprising the at least one polyalkoxylated polyalkylene polyamine represented by structural Formula A is effective for modifying air within the cementitious composition and is devoid of a linear or branched alkyl group having greater than six carbon atoms which would function to entrain air within the cementitious composition.

2. The composition of claim 1 wherein the reaction product of the at least one oxidizing agent and the compound comprising the at least one polyalkoxylated polyalkylene polyamine is derived from polyalkoxylated product of ethylene diamine, diethylene triamine, triethylene tetramine, tetraethylene pentamine, pentaethylene hexamine, propylene diamine, dipropylene triamine, tripropylene tetramine, tetrapropylene pentamine, pentapropylene hexamine, N,N-dimethylethylene diamine, N,N'-dimethylethylene diamine, N,N-dimethylpropylene diamine, N,N'-dimethylpropylene diamine, N,N-diethylethylene diamine, N,N'-diethylethylene diamine, N,N-diethylpropylene diamine, N,N'-diethylpropylene diamine, or a mixture thereof.

3. The composition of claim 1 wherein the reaction product of the at least one oxidizing agent and compound comprising the at least one polyalkoxylated polyalkylene polyamine is derived from polyalkoxylated product of ethylene diamine, diethylene triamine, triethylene tetramine, or mixture thereof.

4. The composition of claim 3 wherein the reaction product of the at least one oxidizing agent and compound comprising the at least one polyalkoxylated polyalkylene polyamine is derived from polyalkoxylated ethylene diamine, diethylene triamine, or mixture thereof.

5. The composition of claim 1 wherein the at least one oxidizing agent for providing the reaction product is selected from the group consisting of hydrogen peroxide, performic acid, peracetic acid, perbenonzoic acid, chloroperoxybenzoic acid, monoperphthalic acid, perfsulfuric acid, molecular oxygen, ozone, or mixture thereof.

6. The composition of claim 1 wherein the at least one oxidizing agent for providing the reaction product is hydrogen peroxide.

7. An aqueous composition comprising an aqueous coating composition and the composition of claim 1.

8. The composition of claim 1 further comprising a trialkanolamine, a lignosulfonate, a sulfonated naphthalene formaldehyde condensate, a sulfonated melamine formaldehyde condensate, an oxyalkylene-containing superplasticizer, an oxyalkylene-containing shrinkage reducing agent, or a mixture thereof.

9. A composition comprising a hydratable cementitious binder and the composition of claim 1.

10. The composition of claim 1 further comprising an oxyalkylene-containing superplasticizer, an oxyalkylene-containing shrinkage reducing agent, or a mixture thereof.

11. The composition of claim 1 further comprising an oxyalkylene-containing superplasticizer.

12. The composition of claim 1 further comprising a set accelerator, a set retarder, or a mixture thereof.

13. The composition of claim 10 further comprising a set accelerator, a set retarder, or a mixture thereof.

14. The composition of claim 1 wherein ethylene oxide groups are present in the amount of 0% to 40% based on the total weight of polyethers in the polyalkoxylated polyalkylene polyamine.

15. The composition of claim 1 wherein 10 molar percent to 100 molar percent of amine groups of the polyalkoxylated polyalkylene polyamine is oxidized into amine oxide groups.

16. The composition of claim 1 wherein the reaction product has a molecular weight of 500 to 7,000.

17. The composition of claim 1 wherein the reaction product has a molecular weight of 1,000 to 6,000.

18. The composition of claim 1 wherein the reaction product has a molecular weight of 2,000 to 4,000.

19. A composition for modifying air in a cementitious composition, comprising:

the reaction product of at least one oxidizing agent and a compound comprising at least one alkoxylated polyethyleneimine represented by structural formula B, -(AO)$_x$(EI)$_y$-  [Formula B], wherein AO represents an alkylene oxide group selected from ethylene oxide, propylene oxide, butylene oxide, or a mixture thereof;

wherein the relative molar amount of ethylene oxide compared to other alkylene oxides within AO is less than fifty percent of the total;

wherein the total sum of the number of ethylene oxide and propylene oxide groups exceeds 25;

wherein x represents an integer of 26 to 100;

wherein EI represents repeating ethyleneimine units in a linear or branched structure;

wherein y represents an integer of 5 to 100;

wherein the relative number of AO chains per repeating ethyleneimine unit is 0.1 to 1.0; and wherein the reaction product of the at least one oxidizing agent and the compound comprising the at least one alkoxylated polyethyleneimine represented by structural Formula B is effective for modifying air within the cementitious composition and is devoid of a linear or branched alkyl group having greater than six carbon atoms which would function to entrain air within the cementitious composition.

* * * * *